United States Patent
Lepp et al.

(10) Patent No.: US 10,104,846 B2
(45) Date of Patent: Oct. 23, 2018

(54) SYSTEM FOR INDOOR PLANT CULTIVATION

(71) Applicant: OÜ Click & Grow, Tallinn, Harju County (EE)

(72) Inventors: Mattias Lepp, Tartu (EE); Priit Pedastsaar, Elva (EE)

(73) Assignee: OÜ Click & Grow, Tallinn (EE)

( * ) Notice: Subject to any disclaimer, the term of this patent is extended or adjusted under 35 U.S.C. 154(b) by 75 days.

(21) Appl. No.: 15/143,642

(22) Filed: May 2, 2016

(65) Prior Publication Data

US 2016/0316646 A1 Nov. 3, 2016

Related U.S. Application Data

(60) Provisional application No. 62/154,752, filed on Apr. 30, 2015.

(51) Int. Cl.
| | |
|---|---|
| *A01G 9/12* | (2006.01) |
| *A01G 31/06* | (2006.01) |
| *A01G 7/04* | (2006.01) |
| *A01G 9/24* | (2006.01) |

(52) U.S. Cl.
CPC .............. *A01G 31/06* (2013.01); *A01G 7/045* (2013.01); *A01G 9/247* (2013.01); *Y02P 60/216* (2015.11)

(58) Field of Classification Search
CPC ........ A47G 7/041; A01G 9/1423; A01G 9/16; A01G 31/06; A01G 7/045
USPC .............................................. 47/18, 39, 66.6
See application file for complete search history.

(56) References Cited

U.S. PATENT DOCUMENTS

| | | | | |
|---|---|---|---|---|
| 4,250,666 | A * | 2/1981 | Rakestraw | A01G 7/045 211/131.1 |
| 4,513,531 | A * | 4/1985 | Lestraden | A01G 9/143 47/39 |
| 5,283,974 | A * | 2/1994 | Graf, Jr. | A01G 9/16 47/60 |
| 8,234,812 | B1* | 8/2012 | Colless | A01G 9/16 47/61 |
| 2003/0097786 | A1* | 5/2003 | Van Horssen | A01G 9/1423 47/17 |
| 2004/0163308 | A1* | 8/2004 | Uchiyama | A01G 7/045 47/1.01 R |
| 2006/0162246 | A1* | 7/2006 | Okabe | A01G 9/16 47/1.01 R |
| 2007/0289207 | A1* | 12/2007 | May | A01G 7/00 47/17 |
| 2009/0025287 | A1* | 1/2009 | Lee | A01G 7/00 47/17 |
| 2012/0324788 | A1* | 12/2012 | Sakura | A01G 9/083 47/66.6 |

FOREIGN PATENT DOCUMENTS

CN 203327646 U 12/2013

* cited by examiner

*Primary Examiner* — Peter M Poon
*Assistant Examiner* — Danielle A Clerkley
(74) *Attorney, Agent, or Firm* — Berggren LLP

(57) ABSTRACT

A system for indoor plant cultivation is disclosed. The system is low cost, simple system that may be used for example at homes, in restaurants, and in schools to grow vegetables and flowers.

9 Claims, 4 Drawing Sheets

SYSTEM FOR INDOOR PLANT CULTIVATION

PRIORITY

This application claims priority of U.S. provisional application No. 62/154,752, filed on Apr. 30, 2015, and the content of which are incorporated herein by reference.

FIELD OF THE INVENTION

The present invention relates to the field of plant growing systems.

BACKGROUND OF THE INVENTION

Known indoor garden systems require expensive, complex pumps, harsh lights, large footprints, and constant calibration of multiple expensive sensors as well as dosing with chemical fertilizers, which many consumers and professional chefs find unappealing.

For example, China utility model CN203327646 describes hydroponic indoor plant cultivation shelf including water circulating system. The problem of such cultivation system is that it does not allow regulating growing conditions according to the actual needs.

The problem of well-known hydroponic, aeroponic, aquaponics, soil cultivation systems is that it is not possible to regulate the pH, temperature, humidity, amount of water, light and nutrients and other growing conditions according to the specific plants' needs. Due the complex systems it is impossible to regulate growing conditions without specific knowledge and thereby some of the conditions may be regulated too much, and some of the conditions too little.

BRIEF DESCRIPTION OF THE INVENTION

The aim of the present invention is to provide a low-cost, ultra-efficient system for indoor plant cultivation to remove the hurdles known from prior art, so anyone without specific knowledge can grow hyperlocal, fresh food in their home, school, restaurant, office or community center with minimal management and easy scalability. The result is higher quality plants, herbs, fruits and vegetables (for example strawberries, tomatoes, basil, lemon balm, thyme, salad rocket, chili peppers, stevia, lettuce, parsley, cilantro and other plants) at a lower cost to the consumer and the environment.

The aim of the present invention is achieved by a system wherein the growing conditions are automatically measured, compared with previously collected growing information and regulated according to the specific plants' needs.

With the seed cartridges of the present disclosure with proprietary growth medium, grow lights and electronic precision irrigation (EPI), the present invention automatically provides plants with the perfect amount of water, light and nutrients at up to 80 percent less than the cost to set up a comparable hydroponic or aeroponic system. The present invention also comprises a connected mobile device application, allowing users to easily adjust growth parameters through the EPI technology to meet custom growing needs.

With various options, the present invention can be set up to fit in any space. In alternative embodiments the present system comprises for example a smaller freestanding enclosed unit to grow 64 plants at once on four shelves and fit a space similar to a small refrigerator unit, and for heavier demands, a larger freestanding enclosed unit for the prosumer will allow people to grow for example 250 individual plants at once. The shelves of the present invention will work independently, allowing use in open-design projects to customize any space.

It is an object of this invention to provide a system for indoor plant cultivation comprising: a frame having at least one first lifting means and at least one second lifting means; at least one lighting system comprising a light panel, multiple grow lights, and at least one sensor block; at least one growth rack comprising water inlet, one or more cells for plant capsules; and a control system comprising a main water inlet, a pump/valve, water pipes and flow sensors for each growth rack, a control center, an analytic center, and control device.

BRIEF DESCRIPTION OF THE DRAWINGS

The present invention is explained more precisely with references to the appended figures, where.

DETAILED DESCRIPTION OF THE INVENTION

Figure 1:
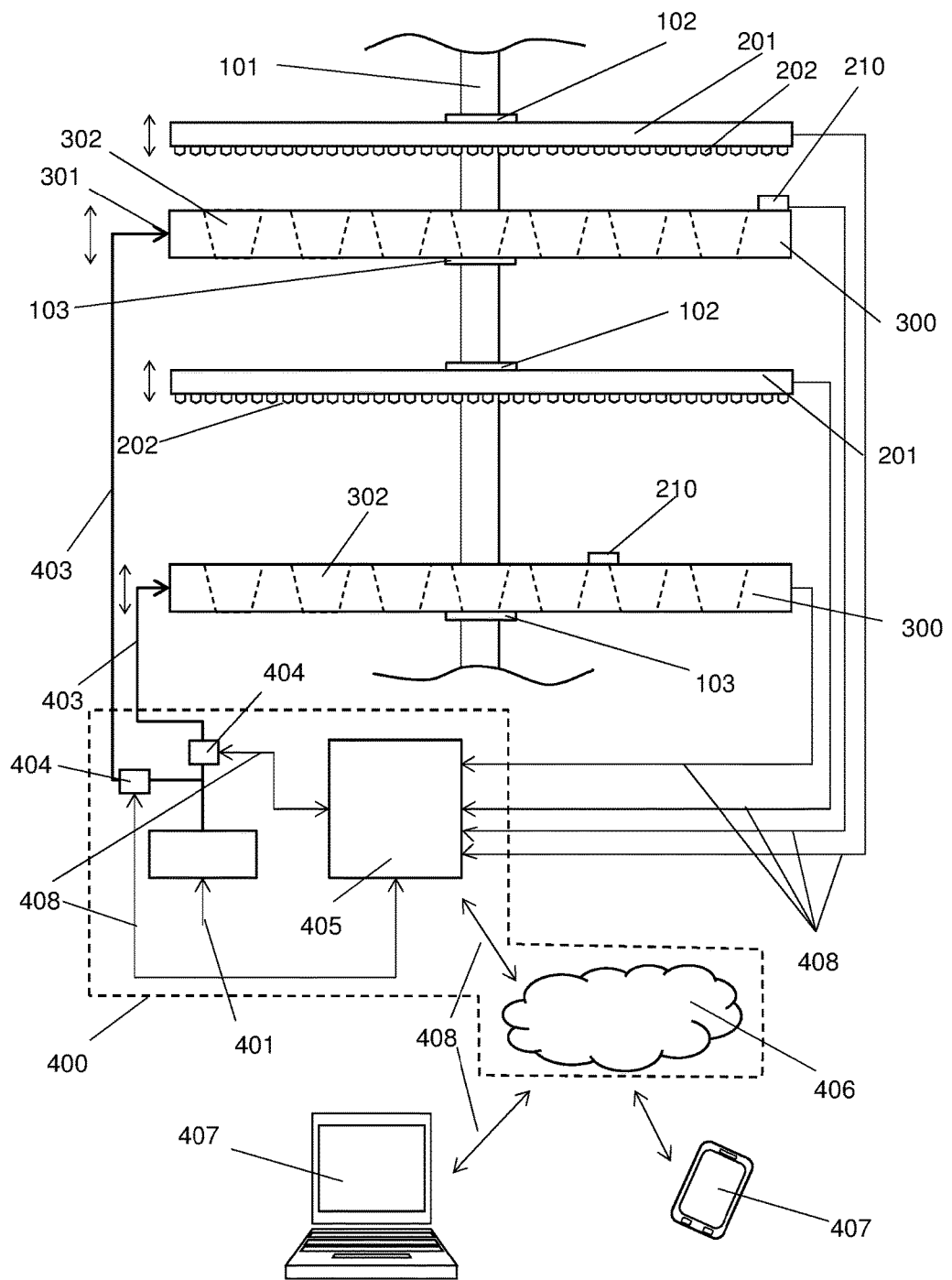
FIG. 1 illustrates the system according to the present invention.

The system according to present invention for indoor plant cultivation comprises frame 101 including at least one first lifting means 102 and at least one second lifting means 103; at least one lighting system comprising a light panel 201, multiple grow lights 202, at least one sensor block 210; at least one growth rack 300 comprising water inlet 301, multiple cells 302 for plant capsules and a control system 400 comprising main water inlet 401, a pump/valve 402, water pipes 403 and at least one flow sensor 404 for each growth rack 300, a control center 405, an analytic center 406 and a control device 407.

The at least one sensor block 210 comprises at least one humidity, temperature, moisture and/or pH sensor.

The growth rack 300 is formed of a tank-like container for the preferably stabilized, fertilized and pre-seeded plant capsules which have great water absorbing capabilities and contains air pockets to provide roots with oxygen.

The pump/valve 402 regulates water supply exactly according to the amount necessary to specific plant in specific environmental conditions. The flow meter 404 records the amount of water supplied. The soil moisture sensor detects soil moisture. In an alternative embodiment the moisture is calculated based on the flow meter readings, plant age, growth stage, temperature, and air humidity.

The control center 405 and the analytic center 406 comprise database of growing information and condition needs of different plants provide suitable growth programs for the plants, as some plants require specific day lengths or specific soil moisture to enter flowering or fruiting stages. Based on the collected sensor data and information in the database regarding the specific plant, the pH and necessary amount of water, air and nutrients for the plants are calculated. The data exchange between the sensor blocks 210 and the control center 405, the control center 405 and the analytic center 406, the analytic center 406 and the control device 407 is a wired or a wireless connection 408.

FIG. 1 illustrates the system according to the present invention wherein the system comprises the first and second lifting means 102 and 103, which are movable up and down manually or automatically and are attached to the frame 101; at least one lighting system comprising light panel 201 and multiple grow lights 202, wherein the lighting system is connected to the first lifting means 102; at least one growth rack 300 comprising water inlet 301, multiple cells 302 for plant capsules and at least one sensor block 210 comprising multiple sensors, wherein the growth rack 300 is connected to the second lifting means 103; control system 400 comprising main water inlet 401, pump/valve 402, water pipes 403 and at least one flow sensors 404 for each growth rack 300, control center 405, analytic center 406 and control device 407, wherein the main water inlet is connected to the flow sensors 404 of control system 400 and flow sensors 404 are connected via water pipes 403 to growth racks 300 and via wired or wireless connection 408 to control center 405. The control center 405 is connected via wired or wireless connection 408 to each lighting system, growth rack 300, sensor block 210, and analytic center 406.

The analytic center 406 comprises for example growth statistics, information regarding the growing conditions, etc.

The lighting system comprises eye friendly grow lights 202. The growth lights are for example energy efficient and eye-friendly ultra-efficient preferably cool white light emitting diodes (LEDs) which can be turned on/off from the control device to provide plants with suitable day-night cycles. Lighting system of the present invention is 40% more energy efficient as High Pressure Sodium (HPS) growth lamps.

Position and height of the growth rack 300 and the lightning module and the distance between the growth rack and lightning module to provide optimal light for the plants is calculated based on sensor data and information regarding the growth condition. Necessary position of the growth rack 300 and lightning module is achieved by moving the rack and lightning module up or down manually or automatically controlled via the control device 407. For the more convenient exploitation the growth rack 300 and lightning module are movable backward and forward manually or automatically controlled via the control device 407.

In a working regime the present system is connected to the public waterworks of home, school, restaurant, office or community center via main water inlet 401 and regular tap water is used for the plants.

Figure 3A:
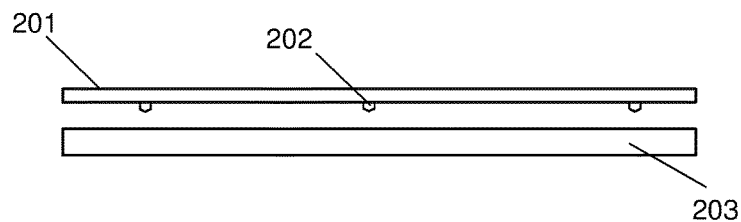
FIG. 3a illustrates an alternative embodiment of the lighting module of the present invention in front view.
Figure 3B:
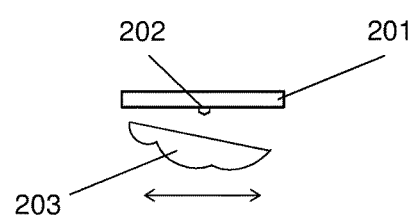
FIG. 3b illustrates the alternative embodiment of the lighting module of the present invention in side view.
Figure 4A:
FIG. 4a illustrates the alternative embodiment of the lighting module of the present invention in front view and in upper lens up position.
Figure 4B:
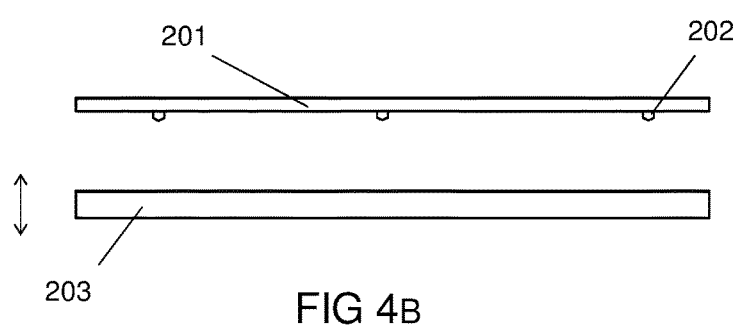
FIG. 4b illustrates the alternative embodiment of the lighting module of the present invention in front view and in lens down position
Figure 4C:
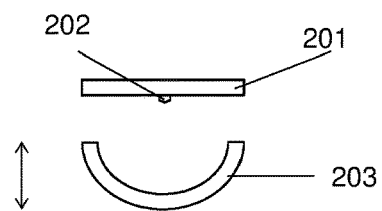
FIG. 4c illustrates the alternative embodiment of the lighting module of the present invention in side view.

In alternative embodiments, shown on FIG. 3a, FIG. 3b and FIG. 4a to FIG. 4b, the lighting system comprises light panel 201, LEDs 202 and lens module 203 comprising concave lenses, convex lens, lenses shaped like shown on FIG. 3b FIG. 4c to focus the light beam in a best suitable angle for the plants depending on the plant size.

The lens module 203 shown on FIG. 3a and FIG. 3b moves from left to right, the lens module shown on FIG. 4a to FIG. 4b moves up and down to adjust the light beam.

The analytics center 406 is for example cloud-based interface which enables the user to control via control device (for example smartphone, personal or portable computer, or any other programmable device) every aspect of the growing system from long distances over the internet, including to adjust plant growth speed and environmental conditions by regulating soil moisture and daylight length and light intensity.

The regulation of the necessary amount of water, air, nutrients is calculated based on the flow meter readings; soil moisture readings; plant age and size; temperature; user input; air by altering substrate porosity; fans and cooling element.

Nutrients are dependent on substrate manufacturing process or can also be added during growth by automatic or manual means.

Figure 2:
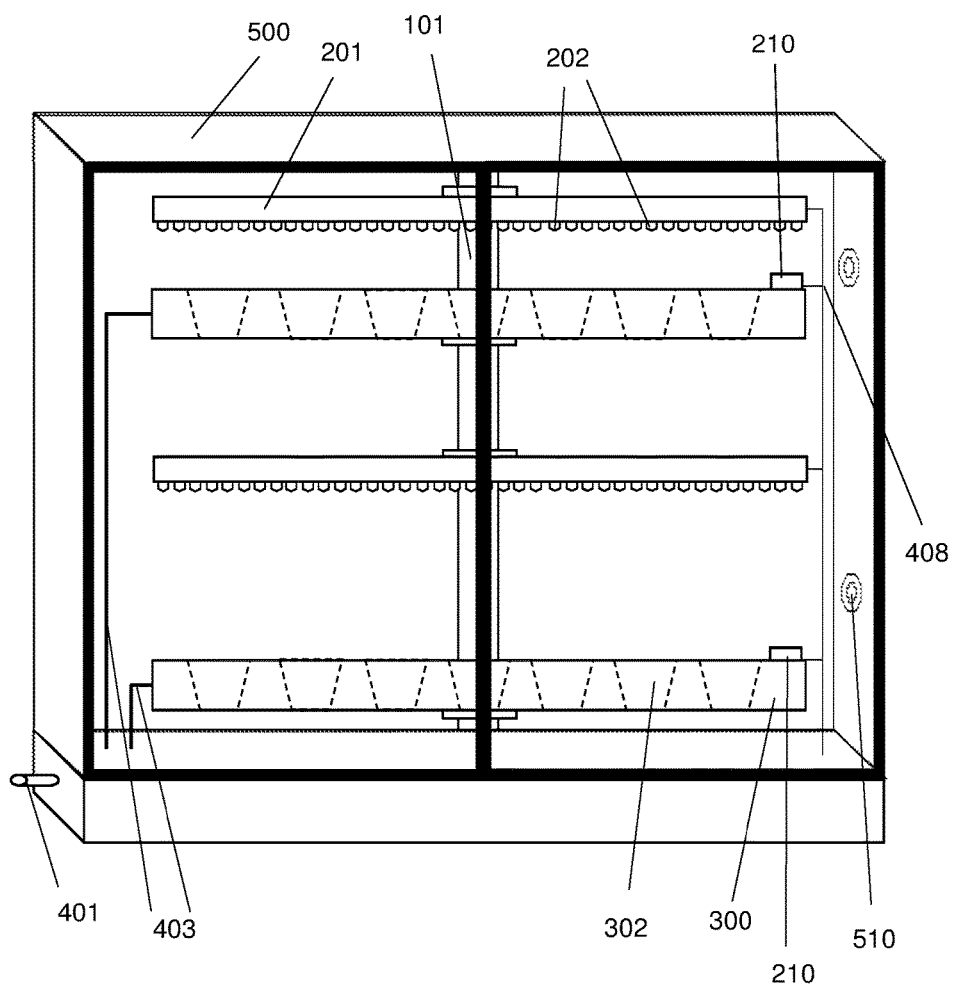
FIG. 2 illustrates the system according to an alternative embodiment of the present invention.

In an alternative embodiment, shown on FIG. 2, the present system comprises an airtight over-pressurized casing 500 to prevent insect infestation, to keep harmful insects and disease vectors outside and to remove excess heat from the growth area. The casing forms an air-tight growth chamber comprising fans 510, humidity, temperature sensors to further adjust the growing environment.

Figure 5:
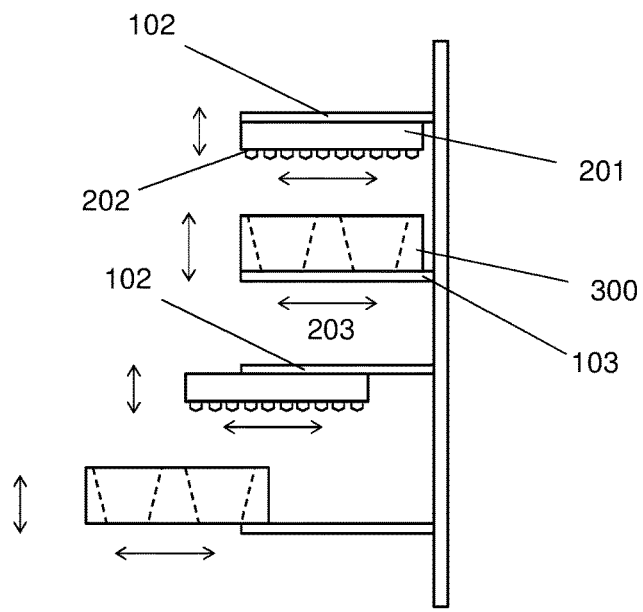
FIG. 5 illustrates the system and movement of lighting system and growth rack shown on FIG. 1 in side view.

FIG. 5 illustrates the motion of lifting means 102 and 103, lighting system and growth rack 300 of the present invention shown on FIG. 1 and FIG. 2. The lifting means 102, 103 are movable up and down, either manually or automatically via the analytic center 406 and the control center 405 by the control device 407. The lighting system and the growth rack 300 are movable up and down with lifting means 102 and 103 and also movable backward and forward. This helps to optimize growing conditions regarding lighting as per the plant's needs.

Figure 6:
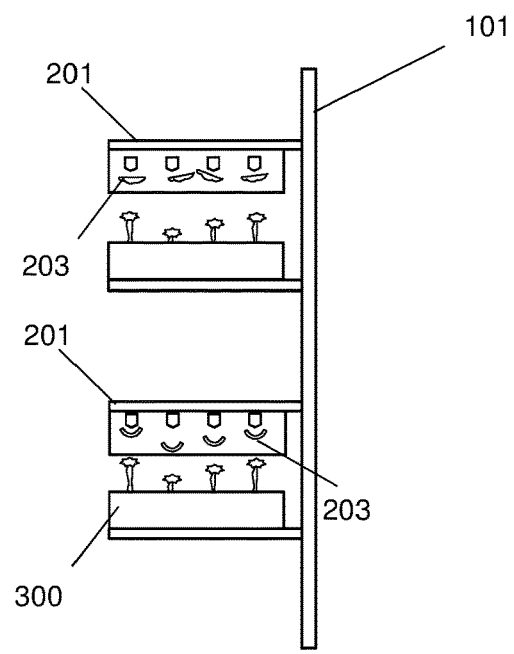
FIG. 6 illustrates the alternative embodiments of the lighting module of the present invention is side view shown on FIG. 3a to FIG. 4c.

FIG. 6 illustrates the alternative embodiment of the present invention wherein the lens module 203 is attached to the lighting system. This enables to regulate the light conditions exactly according to each plant's needs. The light conditions are regulated by moving the light system up and down and the growth rack 300 back and forward and/or moving the lens module 203 up and down, and left to right.

The invention claimed is:
1. A system for indoor plant cultivation comprising:
a frame in a form of a vertical bar,
at least one first horizontally extending structure attached to the vertical bar and being vertically movable along the vertical bar and at least one second horizontally extending structure attached to the vertical bar below the at least one first horizontally extending structure and being vertically movable along the vertical bar;
at least one lighting system comprising a light panel having a multitude of grow lights, said at least one lighting system being supported from its top side by the at least one first horizontally extending structure and configured to move vertically when the at least one first horizontally extending structure moves vertically, and horizontally along the at least one first horizontally extending structure;
at least one growth rack being supported from its bottom side by the at least one second horizontally extending structure and configured to move vertically when the at least one second horizontally extending structure moves vertically, and horizontally along the at least one second horizontally extending structure, said at least one growth rack having an inside volume comprising one or more cells for plant capsules, and a water inlet; and a control system comprising a main water inlet connected to the water inlet of the at least one growth rack, a pump/valve to regulate a water flow to the at least one growth rack, and at least one sensor block for each growth rack;

a control center connected with wired or wireless connections to the at least one lighting system, the at least one growth rack, the at least one sensor block, and to an analytic center; and a control device controlling positions of the at least one lighting system and the at least one growth rack.

2. The system according to claim 1, wherein the analytic center comprises growth statistics, and information regarding growing conditions.

3. The system according to claim 1, wherein the system for indoor plant cultivation is connected to public waterworks.

4. The system according to claim 1, wherein the grow lights are LED lights and the at least one lighting system additionally comprises a lens module.

5. The system according to claim 4, wherein the lens module is horizontally movable.

6. The system according to claim 4, wherein the lens module is vertically movable closer to and further away from the grow lights.

7. The system according to claim 1, wherein the analytic center is controlled, the movement of the at least one first horizontally extending structure and the at least one second horizontally extending structure is operated, and growth conditions are calculated and regulated via the control device.

8. The system according to claim 1, wherein regulation of necessary amounts of water, air, and nutrients is calculated via the control device based on flow sensor readings; soil moisture readings; plant age and size; temperature; user input; air by altering substrate porosity; fans and cooling element.

9. The system according to claim 1, wherein the system for indoor plant cultivation comprises a casing and fans, and humidity and temperature sensors.

* * * * *